United States Patent [19]

Wooters

[11] Patent Number: 4,678,058
[45] Date of Patent: Jul. 7, 1987

[54] VEHICLE SEAT SWITCH
[75] Inventor: Eldon W. Wooters, Lincoln, Nebr.
[73] Assignee: Outboard Marine Corporation, Waukegan, Ill.
[21] Appl. No.: 849,128
[22] Filed: Apr. 7, 1986
[51] Int. Cl.[4] .............................................. B60K 28/00
[52] U.S. Cl. .................................. 180/273; 200/85 A
[58] Field of Search ............ 180/273; 200/85 R, 85 A

[56] References Cited

U.S. PATENT DOCUMENTS

| | | | |
|---|---|---|---|
| 1,387,798 | 8/1921 | Miller | 200/85 R |
| 2,761,038 | 8/1956 | Bruns | 200/85 R |
| 3,500,946 | 3/1970 | Boyajian | 180/273 |
| 3,569,726 | 3/1971 | Reid et al. | 180/273 |
| 3,670,119 | 6/1972 | Gebhardt et al. | 200/52 R |
| 3,694,600 | 9/1972 | Koenig | 200/86 R |
| 3,749,866 | 7/1973 | Tiazkun et al. | 200/85 A |
| 3,769,476 | 10/1973 | Eberle et al. | 200/85 A |
| 3,772,644 | 11/1973 | Hanselmann et al. | 200/85 A |
| 3,946,178 | 3/1976 | Eberle et al. | 200/85 A |
| 4,075,443 | 2/1978 | Fatur | 200/85 A |
| 4,361,741 | 11/1982 | Leskoverc et al. | 200/85 A |
| 4,465,158 | 8/1984 | Yamazaki et al. | 180/273 |

Primary Examiner—David M. Mitchell
Assistant Examiner—Ross Weaver
Attorney, Agent, or Firm—Welsh & Katz, Ltd.

[57] ABSTRACT

A vehicle driver seat is equipped with a switch assembly responsive to the application of a load on the seat to disable the ignition circuitry of the vehicle upon the removal of the load from the seat. The switch assembly includes a generally C-shaped spring located underneath the seat cushion. The end portions of the spring are displaced laterally when the spring is depressed as occurs when an operator sits on the vehicle seat. The lateral displacement of the spring ends pulls a switch plunger to activate the vehicle ignition system.

5 Claims, 2 Drawing Figures

VEHICLE SEAT SWITCH

This invention relates to an ignition safety actuation apparatus for vehicles and more particularly relates to the ignition system for vehicles wherein the electrical system is actuated by a weight responsive operator seat.

BACKGROUND OF THE INVENTION

Ignition safety systems for vehicles, particularly the type utilizing seat operated switches, are generally known in the art. In such devices, the electric circuitry for the vehicle is placed in an operative state when the operator is sitting on the operator's seat, but as soon as the operator removes his weight from the seat, the electric or ignition system becomes inoperative. Such systems are generally controlled by an electric switch mounted to respond to a lowered seat position as might be caused by a depressed seat cushion from an operator sitting in the seat. The switch either opens or closes to thereby render the electric circuitry and vehicle operative, depending upon the type of electric circuit that is employed.

During operation of the vehicle over rough terrain, prior actuation systems have often been found to be too sensitive to movement of the operator in the seat, causing in some cases an undesirable cyclical actuation of the switch, resulting in the vehicle ignition system being turned on and off in rapid succession.

Accordingly, an object of the present invention is to provide an improved ignition system for use in a vehicle for precluding operation of the vehicle without an operator seated in the operator's seat.

Another object of the present invention is to provide an improved switch apparatus for limiting operation of a vehicle to those times when the operator is seated in the vehicle.

A further object of the present invention is to provide an improved means to disable the electrical system of a vehicle until the operator is seated in the operator's seat.

A further object of the present invention is to provide an improved ignition switch which is responsive to the application of pressure and subsequent deflection of the driver's seat cushion in a vertical direction.

These and other objects are attained in accordance with the present invention, wherein an actuator switch assembly is located within an operator's seat for a vehicle. The activator switch assembly includes a C-shaped spring positioned underneath the seat cushion having a central spring portion being directly adjacent the underside of the seat cushion and free shank end portions of the spring oriented in a downward direction. The switch is electrically connected to the ignition circuit of the vehicle so that upon extension of an actuator plunger of the switch, contacts within the switch are closed and the ignition circuit completed, thereby permitting the vehicle to operate. One shank end portion of the spring is secured to the switch thereby anchoring the switch to one end of the spring for movement therewith. The other free shank end portion of the spring is connected to the actuating rod of the switch for following movement therewith. When weight is placed on the seat, depressing the cushion, the spring is correspondingly depressed by the cushion and the spring arch is flattened, causing the end portions of the spring to move outwardly, which moves the actuator rod outwardly, thereby closing the switch contacts, completing the circuit, and permitting the vehicle to operate.

Further features and advantages accruing therefrom will be apparent from the following detailed description of one embodiment of the invention, when read in conjunction with the accompanying drawings.

DETAILED DESCRIPTION OF THE PREFERRED EMBODIMENT

Figure 1:
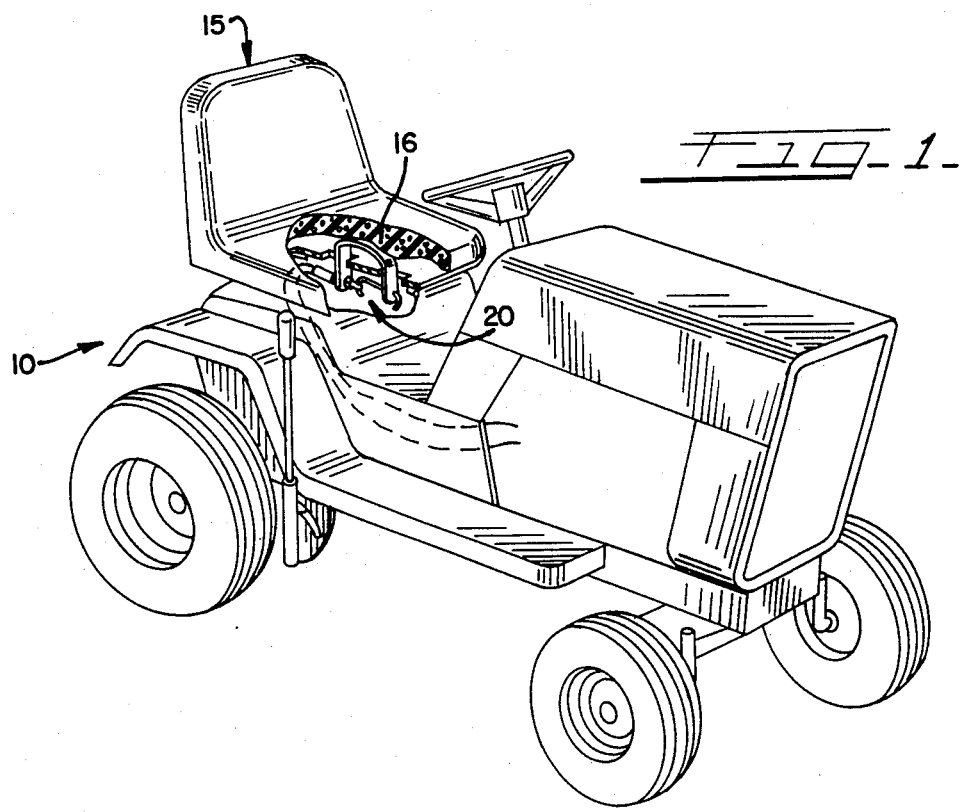
FIG. 1 is a perspective view of a vehicle incorporating the seat switch of the present invention.

Referring to FIG. 1, a typical utility vehicle indicated generally at 10 for use in groundskeeping and other maintenance functions is shown, which may be powered by an electric or gasoline motor (not shown). The vehicle 10 includes an operator seat indicated generally at 15, which seat has a resilient inner portion 16, such as a cushion or the like, which may comprise a polyurethane foam or other type foam pad supported by a lower rigid seat support plate 18.

In the preferred embodiment, the actuator switch 20 is secured solely to a spring inner shank portion 34. However, the actuator switch 20 of the subject invention may be fixedly secured to the vehicle frame by any suitable means such as a clamp affixed to a seat frame support 50. A pair of electric leads, 40 and 42, emanate from the actuator switch 20 for connection to the ignition circuitry of the vehicle for controlling the actuation of such circuitry.

Figure 2:
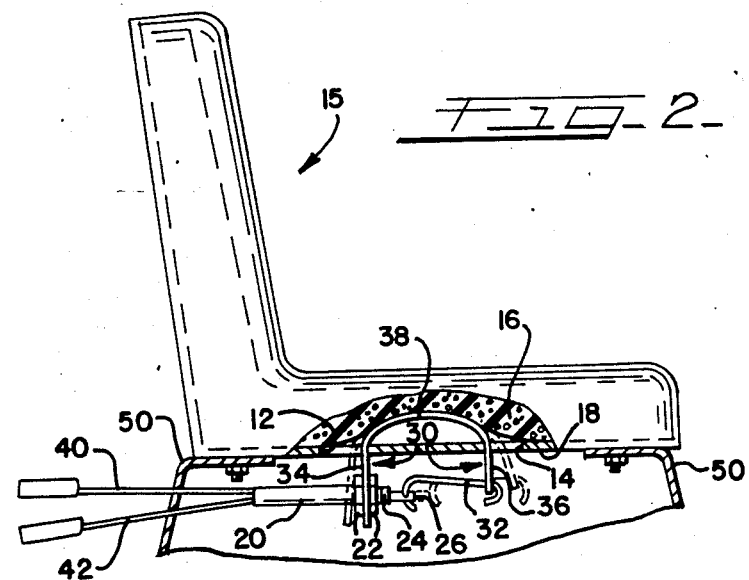
FIG. 2 is a side view of a vehicle seat partially cut away to show the seat switch of the present invention.

The switch 20 has a plunger or actuator rod 26 which is movable in response to an external force applied thereto for placing the switch in either its open or closed position, depending primarily on the position of the actuator rod 26 in its illustrated retracted position, or in an extended position, as shown in phantom in FIG. 2. In the preferred embodiment of the subject invention, the electrical vehicle system is connected in series by the leads 40 and 42 to the switch 20 and is operative in response to the switch 20 being electrically closed in the extended position, and inoperative in response to the switch being electrically open which occurs when it is in the retracted position.

A generally C-shaped spring means indicated generally at 30 is preferably positioned in the approximate center of the vehicle seat, and comprises inner and outer vertical shank portions 34 and 36, respectively, connected by a generally horizontal arcuate central portion 38. Central spring portion 38 is generally in continuous contact with the underside of cushion 16, and responds to a vertical deflection of the cushion with a corresponding vertical deflection and flattening of the central portion 38. The spring 30 may be formed of any suitable resilient material, but in the preferred embodiment, the spring comprises a flat spring steel strip formed in the C-shape noted above.

The inner and outer spring shank portions 34 and 36 extend through openings 12 and 14, respectively, in the seat support plate 18, for connection to the switch leaving support of the spring 30 primarily at the spring corners which contact seat support plate 18 as shown.

The inner end portion 34 of spring 30 is secured to the switch 20 by nuts 22 received on a threaded end portion 24 of the body of the switch 20. The position of the spring inner end portion 34 may be adjusted relative to the switch 20 and the outer end portion 36 by the selective adjustment of the nuts 22 on the threaded portion 24 of the switch 20. This permits the sensitivity of the actuation of the switch to be adjusted in response to lighter or heavier loads depressing the seat cushion. For greater sensitivity, i.e., actuation with lighter weights, the inner end portion 34 is secured in place further away from the outer end portion 36, while the opposite is true if less sensitivity, i.e., a greater load being necessary to actuate the switch, is desired.

The outer spring end portion 36 is connected by a linkage 32 to the actuating plunger 26. The linkage 32 may comprise a wire, a chain, a rod or other means of connection of the actuator rod 26 with the outer end portion 36 to the spring.

When a load is applied to the seat 15, the weight of the load will cause the cushion 16 to deflect towards the support plate 18. The change in the elevational position of the cushion 16 will result in an equivalent vertical movement of the central arcuate portion 38 of the spring 30, reducing the arch of the spring central portion 38, being in contact with the seat cushion 16. Downward movement of spring 30 is restricted by the support plate 18 between openings 12 and 14, which contacts end portions 34 and 36 and leads primarily to a reduction of the curvature of the arch of the central spring portion or a flattening of that portion. This downward movement and flattening of the arch of the central portion 38 of the spring causes both the inner and outer end portions 34 and 36 of the spring to move outwardly or away from each other in a predetermined manner. The location of both the inner and outer end portions 34 and 36 of the spring 30 when under load is shown in phantom in FIG. 2. Such outward movement of the outer end portion results in the forcible extension of the switch actuator plunger 26 to the electrically closed and extended position thereby placing the electrical system of the vehicle in the operative mode and permitting engagement and operation of the motor therein.

Upon removal of the load from the seat, the cushion 16 of the seat 15 will return to its original undeflected position, causing the spring central portion 38 to return to its relaxed state and draw the inner and outer spring portions 34 and 36 toward one another. This inward motion retracts the actuator plunger 26 of the switch 20, thereby placing the switch in the electrically open position and rendering the vehicle ignition system, and thus the vehicle itself, inoperative.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments and equivalents falling within the scope of the appended claims.

Various features of the invention are set forth in the following claims.

What is claimed is:

1. An apparatus for selectively interrupting the ignition circuit of an ignition system for a vehicle motor in response to a load being applied to a vehicle operator seat assembly mounted to the vehicle, the seat assembly having a support plate and a cushion means supported by said support plate, said apparatus comprising a switch means, a plunger mounted in said switch means for reciprocal movement along a generally longitudinal axis and adapted to electrically actuate the switch means, a spring means having a first end portion, a second end portion and an arcuate central portion, said first end portion being connected to said second end portion by said arcuate central portion, said arcuate central portion being vertically moveable responsive to the vertical movement of said cushion means, said support plate having a first opening for the passage of said first end portion and a second opening for the passage of said second end portion, the portion of said support plate between said first and second openings being adapted to contact the bottom end portions of said arcuate central portion of spring means and facilitate the flattening of the same in response to vertical movement of the cushion means, said first end portion of said spring means being secured to said switch means, said plunger being connected to said second end portion of said spring means, said second end portion and said plunger being movable in a generally horizontal direction in response to vertical movement of said central portion thereby actuating said switch means between electrically open and closed postions upon the selective application and removal of a load to said seat assembly.

2. An apparatus for controlling an ignition circuit connecting the ignition system of a vehicle engine to a power source, said apparatus being selectively responsive to the presence and absence of a load on an operator seat of the vehicle, said apparatus including a seat assembly including a compressible cushion on a seat support, an actuable switch having a body and an actuating rod movable relative to said body between retracted and extended positions for electrically opening and closing said switch, actuating means for moving said actuating rod between said positions, said actuating means comprising a generally C-shaped flat spring steel strip means, said spring steel strip means having a generally vertical inner end portion and a generally vertical outer end portion, said end portions being connected by a generally horizontal central arcuate portion, said arcuate portion being adjacent a lower surface of said compressible cushioning material and responsive to vertical travel of said compressible cushioning material, said inner end portion of said spring steel strip means being operatively connected to said switch, said outer end portion of said spring steel strip means being operatively connected to said actuator rod for moving said actuator rod in response to longitudinal movement of said outer end portion relative to said inner end portion of said spring steel strip means, said outer end portion being movable relative to said inner end portion in response to the downward deflection of said arcuate central portion of said spring steel strip means, and thereby causing the operative connection between said outer end portion of said spring steel strip means and said actuating rod to actuate said switch.

3. The apparatus of claim 2 wherein said seat support includes an opening, said inner end portion protruding through said opening for said operative connections with said switch.

4. The apparatus of claim 3 further including two openings whereby each spring end portion protrudes through a separate opening.

5. An apparatus for selectively interrupting the ignition circuit of an ignition system for a vehicle motor in response to a load being applied to a vehicle operator seat assembly mounted to the vehicle, the seat assembly having a seat frame means and a cushion means supported by the seat frame means, said apparatus comprising a switch means, a plunger mounted in said switch means for reciprocal movement along a generally longitudinal axis and adapted to electrically actuate the switch means, a spring means having a first end portion, a second end portion and an arcuate central portion, said first end portion being connected to said second end portion by said arcuate central portion, said arcuate central spring portion is in contact with a lower surface of said cushion and vertically movable to flatten said arcuate control spring portion in response to vertical movement of said cushion on the applicaton of a load to said seat, said first end portion of said spring means being secured to said switch means, said plunger being connected to said second end portion of said spring means, said second end portion and said plunger being movable in a generally horizontal direction in response to vertical movement of said central portion thereby actuating said switch means between electrically open and closed positions upon the selective application and removal of a load to said seat assembly.

* * * * *